US009301183B2

(12) United States Patent
Heo et al.

(10) Patent No.: US 9,301,183 B2
(45) Date of Patent: Mar. 29, 2016

(54) TRANSMISSION OF UPLINK CONTROL INFORMATION IN INTER-ENB CARRIER AGGREGATION

(71) Applicant: Intel Corporation, Santa Clara, CA (US)

(72) Inventors: Youn Hyoung Heo, Seoul (KR); Seunghee Han, Kyoungkido (KR); Yujian Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 13/927,823

(22) Filed: Jun. 26, 2013

(65) Prior Publication Data

US 2014/0092865 A1 Apr. 3, 2014

Related U.S. Application Data

(60) Provisional application No. 61/707,784, filed on Sep. 28, 2012.

(51) Int. Cl.
*H04W 72/04* (2009.01)
*H04W 24/10* (2009.01)
(Continued)

(52) U.S. Cl.
CPC ............. *H04W 24/10* (2013.01); *H04J 3/1694* (2013.01); *H04J 11/0086* (2013.01);
(Continued)

(58) Field of Classification Search
CPC ..... H04W 48/16; H04W 72/02; H04W 72/12; H04W 72/0406; H04W 72/0413; H04W 72/042; H04W 72/0486; H04W 76/025; H04L 5/0055
See application file for complete search history.

(56) References Cited

U.S. PATENT DOCUMENTS 8,897,180 B2 * 11/2014 Choi ................. H04W 72/0406
370/280
8,995,313 B2 * 3/2015 Yang .................... H04L 1/1854
370/252
(Continued)

FOREIGN PATENT DOCUMENTS

EP 2026617 A1 2/2009
KR 10-2011-0090784 A 8/2011
(Continued)

OTHER PUBLICATIONS

International Searching Authority, International Search Report and Written Opinion for PCT Patent Application No. PCT/US2013/061562, mailed on Jan. 28, 2014, 17 pages.
(Continued)

*Primary Examiner* — Ahmed Elallam
(74) *Attorney, Agent, or Firm* — Stoel Rives LLP (57) ABSTRACT

A user equipment (UE) for communication in a wireless network supporting inter-EUTRAN Node B (eNB) carrier aggregation has a receiver to communicate with a first eNB corresponding to a primary cell (PCell) in the wireless network and a second eNB corresponding to a secondary cell (SCell) in the wireless network. The receiver is configured to receive downlink data through a physical downlink shared channel (PDSCH) in the SCell. The UE has a processor configured to, in response to receiving the downlink data, generate a hybrid automatic repeat request acknowledgement (HARQ-ACK) for the SCell. A transmitter of the UE is configured to transmit, through a first physical uplink control channel (PUCCH) in the PCell, uplink control information (UCI) including the HARQ-ACK for the SCell.

20 Claims, 6 Drawing Sheets

(51) Int. Cl.

| | |
|---|---|
| *H04W 28/02* | (2009.01) |
| *H04W 52/04* | (2009.01) |
| *H04W 52/02* | (2009.01) |
| *H04W 48/14* | (2009.01) |
| *H04W 52/14* | (2009.01) |
| *H04W 24/08* | (2009.01) |
| *H04W 40/24* | (2009.01) |
| *H04W 48/16* | (2009.01) |
| *H04W 72/02* | (2009.01) |
| *H04W 76/02* | (2009.01) |
| *H04W 88/02* | (2009.01) |
| *H04W 76/04* | (2009.01) |
| *H04J 11/00* | (2006.01) |
| *H04J 3/16* | (2006.01) |
| *H04L 1/18* | (2006.01) |
| *H04W 74/00* | (2009.01) |
| *H04W 36/08* | (2009.01) |
| *H04W 48/18* | (2009.01) |

(52) U.S. Cl.
CPC ............ *H04L 1/1812* (2013.01); *H04W 24/08* (2013.01); *H04W 28/0221* (2013.01); *H04W 40/246* (2013.01); *H04W 48/14* (2013.01); *H04W 48/16* (2013.01); *H04W 52/0209* (2013.01); *H04W 52/0212* (2013.01); *H04W 52/0235* (2013.01); *H04W 52/04* (2013.01); *H04W 52/14* (2013.01); *H04W 72/02* (2013.01); *H04W 72/042* (2013.01); *H04W 72/0406* (2013.01); *H04W 72/0413* (2013.01); *H04W 74/002* (2013.01); *H04W 76/025* (2013.01); *H04W 76/046* (2013.01); *H04W 76/048* (2013.01); *H04W 88/02* (2013.01); *H04W 36/08* (2013.01); *H04W 48/18* (2013.01); *H04W 52/0261* (2013.01); *Y02B 60/50* (2013.01)

(56) References Cited

U.S. PATENT DOCUMENTS

| | | | | |
|---|---|---|---|---|
| 2009/0257390 | A1 | 10/2009 | Ji et al. | |
| 2011/0310820 | A1 | 12/2011 | Liao | |
| 2012/0039278 | A1 | 2/2012 | Park et al. | |
| 2012/0113827 | A1* | 5/2012 | Yamada et al. | 370/252 |
| 2012/0113944 | A1* | 5/2012 | Yang | H04L 1/1861 370/329 |
| 2012/0257570 | A1* | 10/2012 | Jang | H04L 1/1854 370/328 |
| 2012/0294272 | A1* | 11/2012 | Han et al. | 370/329 |
| 2013/0039231 | A1* | 2/2013 | Wang | H04W 72/10 370/280 |
| 2013/0114472 | A1* | 5/2013 | Tamaki et al. | 370/280 |
| 2013/0153298 | A1* | 6/2013 | Pietraski et al. | 175/45 |
| 2013/0242881 | A1* | 9/2013 | Wang | H04L 1/18 370/329 |
| 2013/0301433 | A1* | 11/2013 | Yin | H04W 16/02 370/252 |
| 2013/0308550 | A1* | 11/2013 | Yin | H04L 5/001 370/329 |
| 2013/0322372 | A1* | 12/2013 | Kim et al. | 370/329 |
| 2013/0336160 | A1* | 12/2013 | Yin | H04L 1/1887 370/254 |

FOREIGN PATENT DOCUMENTS

| | | |
|---|---|---|
| WO | 2014/021984 A1 | 2/2014 |
| WO | 2014/052375 A1 | 4/2014 |

OTHER PUBLICATIONS

3GPP TS 36.321: "Evolved Universal Terrestrial Radio Access (E-UTRA); Medium Access Control (MAC) protocol specification", http://www.3gpp.org/DynaReport/36321.htm, Sep. 24, 2012 (55 pages).

3GPP TS 36.331: "Evolved Universal Terrestrial Radio Access (E-UTRA); Radio Resource Control (RRC); Protocol specification", http://www.3gpp.org/DynaReport/36331.htm, Sep. 26, 2012 (325 pages).

R2-123997: Introduction of 1CC transmission in a TTI for UL CA; NTT Docomo, Inc., Fujitsu, NEC, Panasonic; Disc; http://www.3gpp.org/DynaReport/TDocExMtg--R2-79--29009.htm, Aug. 13, 2012 (Qingdao, China), 3 pages.

* cited by examiner

TRANSMISSION OF UPLINK CONTROL INFORMATION IN INTER-ENB CARRIER AGGREGATION

RELATED APPLICATIONS

The present application claims the benefit under 35 U.S.C. §119(e) of U.S. Provisional Patent Application No. 61/707,784, filed Sep. 28, 2012, which is hereby incorporated by reference herein in its entirety.

TECHNICAL FIELD

Embodiments of the present disclosure generally relate to wireless communications and, more particularly, to wireless networks such as evolved universal terrestrial radio access (E-UTRA) networks (EUTRANs) operating in accordance with third-generation partnership project (3GPP) standards for long term evolution (LTE) networks.

BACKGROUND INFORMATION

Conventional cellular networks, including conventional LTE networks, employ frequent user equipment (UE) handovers, particularly in heterogeneous-network deployment scenarios including macrocells and smallcells (i.e., picocells, femtocells, remote radio heads (RRH), and other smallcell types). For example, because a smallcell coverage region may encompass a smaller region than that of a macrocell, a UE wirelessly connected only to the smallcell may need to handover to a macrocell or to a second smallcell as the UE is moved from the initial smallcell coverage region. On the other hand, handover may not be necessary when the UE is already connected to the macrocell and is within its larger coverage region, but offloading data transmission bandwidth served by a smallcell would not be available if the UE is connected to only the macrocell.

Previous attempts to achieve offloading and to reduce the frequency of handovers have employed carrier aggregation (CA). In CA systems, a UE is simultaneously served by at least two serving cells: a primary cell (PCell) and one or more secondary cell(s) (SCell). For example, a macrocell may serve as a PCell that provides non-access stratum (NAS) mobility information and security input whereas a smallcell may serve as an SCell downlink secondary component carrier providing additional data transmission bandwidth that the UE offloads to the smallcell. Because the PCell is responsible for the network connection mobility management of the UE, the UE need not handover so long as the UE is moving within the macrocell coverage region.

DETAILED DESCRIPTION OF EMBODIMENTS

Aspects and advantages of the present disclosure will be apparent from the following detailed description of embodiments, which proceeds with reference to the aforementioned drawings.

1. Example Network for Carrier Aggregation

Figure 1:
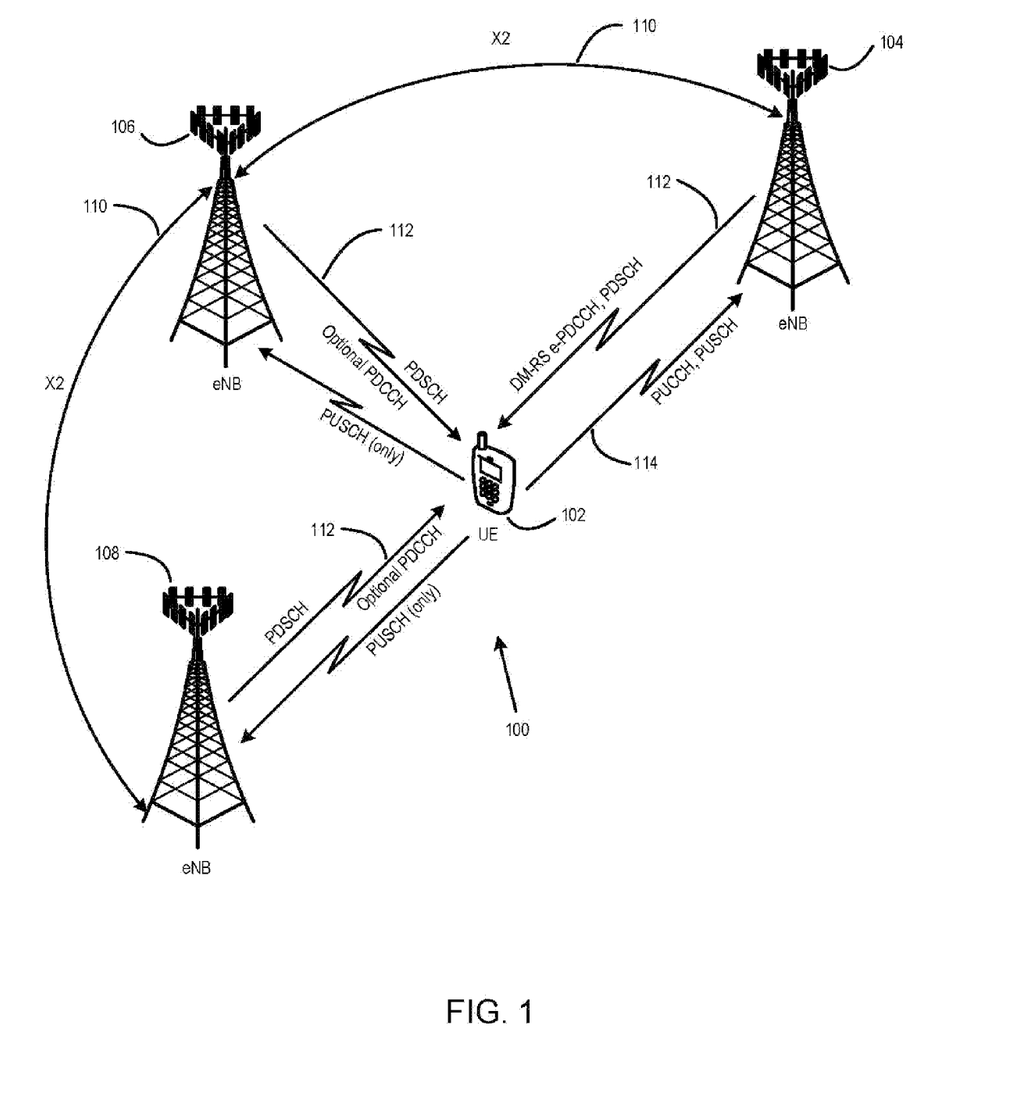
FIG. 1 is a block diagram of a wireless network in accordance with some embodiments.

FIG. 1 illustrates a wireless network in accordance with some embodiments. A wireless network 100 includes a UE 102 and a plurality of eNBs 104, 106, and 108 providing communication services to UEs, such as UE 102. In some embodiments, eNBs 104, 106, and 108 may communicate with one another over an X2 interface 110. Each eNB 104, 106, and 108 may be associated with a set of one or more serving cells that may include macrocells and smallcells.

In some embodiments, eNB 104 and eNB 106 (or other eNBs) may engage in inter-eNB CA. In inter-eNB CA, serving cells (PCells and SCells) are operated among different eNBs. For example, the PCell is served from a macrocell of eNB 104, an SCell is served from a smallcell of eNB 106, and those serving cells communicate through the X2 interface 110. With inter-eNB CA, two or more component carriers of different cells collectively serve UE 102 that receives resource blocks of a downlink channel 112 available from two or more eNBs (e.g., eNB 104, 106, or 108).

Typically, a PCell is configured with one physical downlink control channel (PDCCH) and one physical uplink control channel (PUCCH). It could also have a physical downlink shared channel (PDSCH) or a physical uplink shared channel (PUSCH). An SCell could be configured with those shared channels and a PDCCH, but usually no PUCCH in conventional LTE. In some embodiments, the downlink channel 112 include a PDSCH and PDCCH. In some embodiments, an uplink channel 114 may include a PUSCH or PUCCH.

Figure 2:
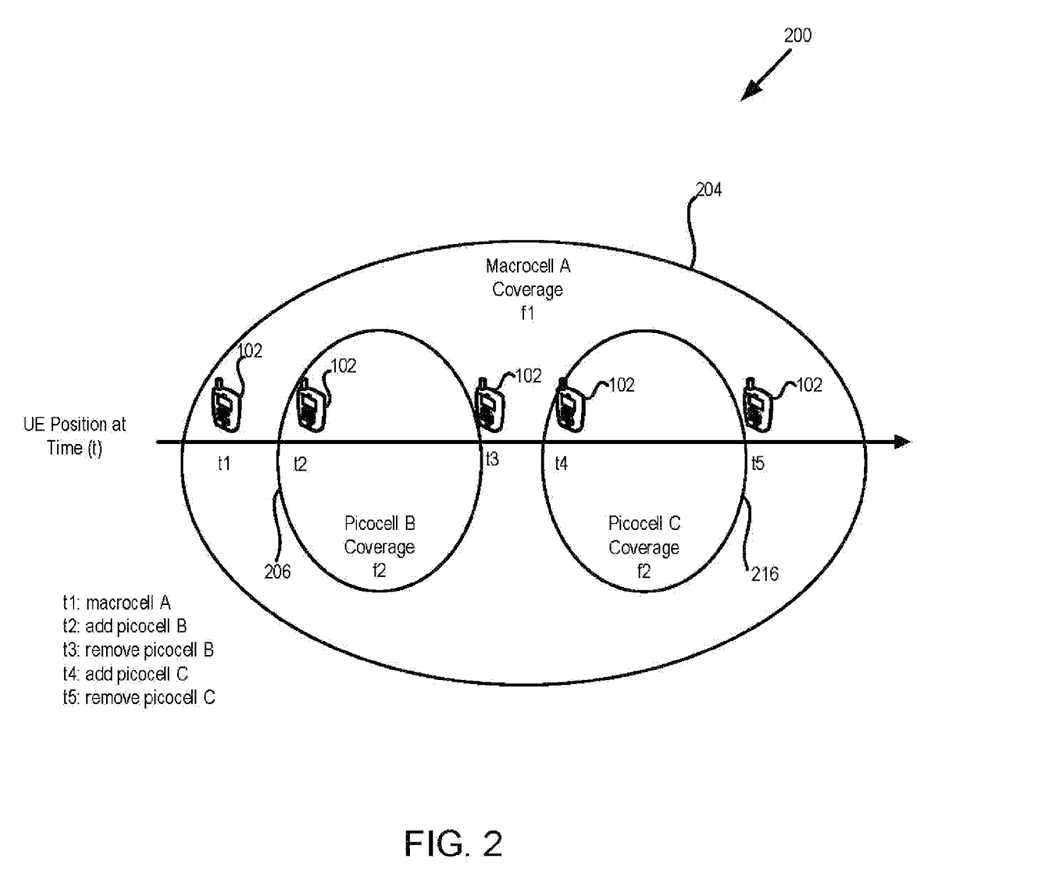
FIG. 2 is a timeline showing a carrier aggregation deployment scenario in accordance with some embodiments.

FIG. 2 illustrates an example CA deployment scenario 200 showing an SCell addition/removal process performed (in lieu of handovers) as UE 102 transitions within a macrocell coverage region (PCell) 204 and between smallcell coverage regions (PCell) 206, 216. In the example 200, PCell 204 may be a macrocell and SCells 206, 216 may be smallcells, however, other configurations are possible. UE 102 may be served by macrocell A at time t1, may add smallcell B at time t2, may remove smallcell B at time t3, may add smallcell C at time t4, and may remove smallcell C at time t5. The change from the smallcell B to smallcell C is supported with SCell addition/removal instead of handover. Data may be offloaded from PCell 204 to the one or more of SCells 206, 216 thereby reducing the bandwidth requirements of PCell 204.

2. Providing UCI to SCells

Conventional LTE CA system had supported CA between sets of serving cells belonging to the same eNB. This meant a UE need not provide UCI—such as hybrid automatic repeat request acknowledgement (HARQ-ACK), Channel State Information (CSI), and Scheduling Requests (SR)—to both its PCell and SCell as those cells would belong to the same eNB and its UCI could be readily shared among the set of serving cells. Therefore, conventional LTE CA systems, in accordance with LTE Release 10 CA (LTE Rel-10), have reduced parallel uplink (UL) transmission and extended UL coverage by using one carrier for transmission of UCI.

In contrast to LTE Rel-10 CA, with inter-eNB CA, PCells and SCells may be served from macrocells and smallcells associated with different eNBs. Attempts to provide the UCI to an SCell in inter-eNB CA have proposed an additional (redundant) transmission of that information on a PUCCH of the SCell. Such techniques, however, use two separate PUCCH transmissions that consequently increase maximum power reduction (MPR) when two PUCCHs are transmitted simultaneously. The increased MPR causes reduced maximum transmit power and, consequently, reduces the size of the UL coverage region.

The following sections discuss various embodiments to provide UCI to a set of serving cells among different eNBs. Sections 2.1, 2.2, and 2.3 of the present disclosure describe embodiments for a smallcell to receive UCI in which the smallcell is configured as an SCell, (e.g., a pico-eNB) and the UE is being served by a macrocell of a different eNB. Sections 2.4 and 2.5 describe embodiments for inter-eNB CA in which the UE transmits on both macrocell and smallcells. Section 2.6 describes an embodiment applicable irrespective of whether a UE transmits in a macrocell only or to both macrocell and smallcells.

2.1. Forwarding HARQ-ACK and CSI Information to SCell

Figure 3:
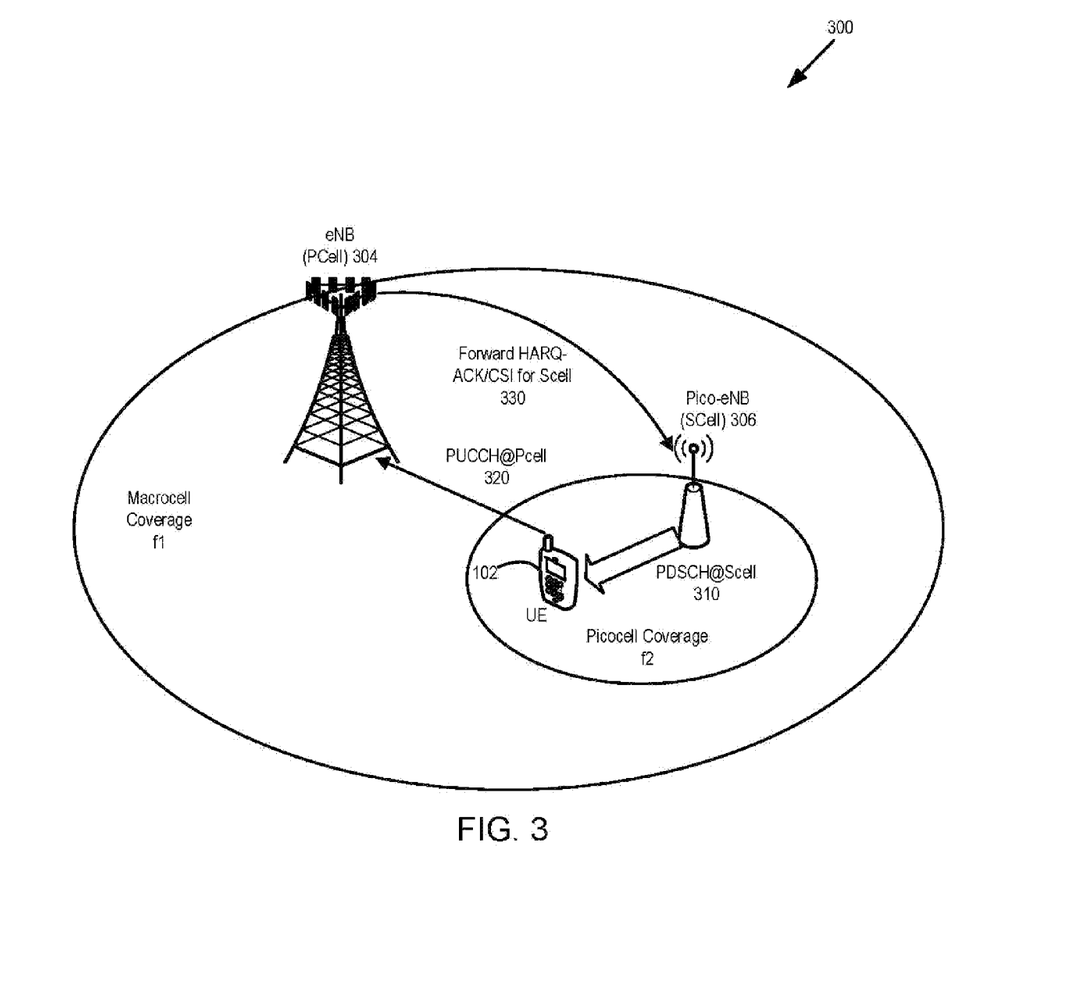
FIG. 3 is a block diagram showing an example of uplink control information (UCI) forwarding in inter-EUTRAN Node B carrier aggregation (inter-eNB CA).

In a set of inter-eNB CA serving cells associated with different eNBs, the PCell and SCell could exchange UCI received in a single transmission by use of X2 interface 110 (FIG. 1) between the different eNBs. X2 interfaces have non-ideal backhauls (e.g., a wired lines) producing UCI-exchange delays in the range of approximately 10 to 20 ms. FIG. 3 shows such an example of HARQ-ACK transmission 300. With inter-eNB CA, the same PUCCH transmission as in LTE Rel-10 CA can be used if a PCell 304 (i.e., a macrocell) forwards UCI to an SCell 306 (i.e., a smallcell). If PDSCH 310 is scheduled from smallcell 306, UE 102 transmits HARQ-ACK to macrocell 304 on PUCCH 320. Macrocell 304 then forwards HARQ-ACK information 330 to smallcell 306 over X2 interface 110.

To forward HARQ-ACK information, there is an issue to be resolved for PUCCH format resource allocation. In LTE networks, there are two PUCCH formats that are used to transmit HARQ-ACK for CA. For frequency division duplexing (FDD) CA, a UE supporting up to two serving cell aggregations uses "PUCCH format 1b with channel selection" and a UE supporting more than two serving cell aggregations can be configured by "PUCCH format 1b with channel selection" or "PUCCH format 3." For time division duplexing (TDD) CA, a UE can be configured by "PUCCH format 1b with channel selection" or "PUCCH format 3."

In both PUCCH formats, the PUCCH resource that is actually used is indicated by transmit power control (TPC) command bits (so-called ARI: acknowledgment/negative acknowledgement (ACK/NACK) resource indicator) provided in a PDCCH that is used for SCell scheduling. Therefore, to keep using TPC command bits to select PUCCH format resource in conjunction with the technique of forwarding HARQ-ARK information, macrocell 304 and smallcell 306 are synchronized in (jointly) determining the actual PUCCH resource before PDSCH is scheduled by SCell 306. In one embodiment for predetermining the PUCCH resource, macrocell 304 determines one PUCCH resource among four candidates and indicates this PUCCH resource information to SCell 306. This PUCCH resource could then be used until SCell 306 is removed or macrocell 304 updates it with a new PUCCH resource.

In another embodiment, instead of using TPC command bits, the PUCCH resource that is used when SCell 306 is scheduled is configured directly by macrocell 304. Thus, UE 102 uses the explicitly configured PUCCH resource without using TPC command bits. The TPC command bits can be reserved and re-purposed for SCell 306.

In cases where UE 102 misses PDCCH scheduling information of SCell 306 PDSCH 310, and PCell 304 is configured to forward HARQ-ACK for SCell 306, PCell 304 may not be aware that UE 102 has missed the PDCCH. Accordingly, UE 102 would have missed the PDCCH and would then send a HARQ-ACK for only PCell 304, in which case PCell 304 would be incapable of sending a HARQ-ACK to SCell 306. Therefore, SCell 306 may wait indefinitely for its HARQ-ACK information. In this case, if PCell 304 sends only its HARQ-ACK information, there may be misalignment in HARQ-ACK information delivery between PCell 304 and SCell 306. Therefore, in some embodiments, timing information—i.e., information indicating when a HARQ-ACK is received—is provided for or with HARQ-ACK information. For example, system frame number (SFN) and/or subframe number can be included in or with HARQ-ACK information.

2.1-1. Configured PUCCH Cell

A PUCCH cell means a cell that is configured to transmit PUCCH. As shown in FIG. 3, if PCell 304 is the PUCCH cell, and UE 102 transmits PUCCH on PCell 304, the transmit power will be relatively high because of large pathloss resulting from transmitting information over a distance that is greater to the macrocell than to the smallcell. In this case, eNB can configure the PUCCH cell to accommodate UE 102 so that UE 102 can transmit PUCCH on SCell 306. In this configuration, the transmit power for PUCCH can be reduced due to the relatively small pathloss between smallcell 306 and UE 102.

In some embodiments, a single PUCCH cell can be configured for all PUCCH formats (PUCCH format 1/1a/1b, PUCCH format 2/2a/2b, PUCCH format 3, and PUCCH format 1b with channel selection) together. In other embodiments, different PUCCH cells can be independently configured for different PUCCH formats by radio resource control (RRC) signaling. For example, a different PUCCH cell can be configured for each PUCCH format. When a PUCCH cell is configured by SCell 306, the HARQ-ACK forwarding technique from smallcell 306 to macrocell 304 can follow the foregoing description of section 2.1.

As another aspect related to scheduling requests, the scheduling request using PUCCH format 1 (on an SR resource) or PUCCH format 3 (on an ACK/NACK resource) can be transmitted on SCell 306 based on the PUCCH configuration. This is motivated by the fact that smallcell 306 is likely to be used as a boosting cell conveying large amount of data. Consequently, restricting the SR transmission on SCell (smallcell) 306 can help reducing scheduling latency due to backhaul latency in forwarding SR from the macrocell to smallcell. Thus, for a smallcell, the high-throughput data can be communicated without loss of backhaul delay, but for macrocell it may have some loss from backhaul delay.

In another embodiment, to reduce delay both for macrocell (PCell) 304 and smallcell (SCell) 306, the same SR can be transmitted on both PCell 304 and SCell 306, simultaneously. If UL switching is applied, the same SR can be transmitted in an alternating manner (i.e., an SR PUCCH on PCell 304 at subframe n and the SR PUCCH on SCell 306 at subframe n+1).

This concept of configuring PUCCH on an Scell can be also extended to other PUCCHs (including, for example, an ACK/NACK resource using PUCCH format 1a/1b, PUCCH format 1b with channel selection, and PUCCH format 3) to convey HARQ-ACK information. Accordingly, for SCell 306 (which would typically be used for high-throughput data transmission) latency of UCI should be minimized. On the other hand, given that PCell (macrocell) 304 is likely to be used to maintain the connectivity to the cell, a low data transmission rate can be made in PCell 304 and hence, it may be tolerable for the latency of UCI even by passing UCI from smallcell 306 to macrocell 304.

Alternatively, to maintain the throughput on both of PCell 304 and SCell 306, the same HARQ-ACK (possibly aggregated ACK/NACK for CA) can be transmitted both on PCell 304 and SCell 306, simultaneously. If UL switching is applied, the same aggregated HARQ-ACK can be transmitted in an alternating manner (i.e., a HARQ-ACK PUCCH on PCell 304 at subframe n and the HARQ-ACK PUCCH on SCell 306 at subframe n+1).

Figure 4:
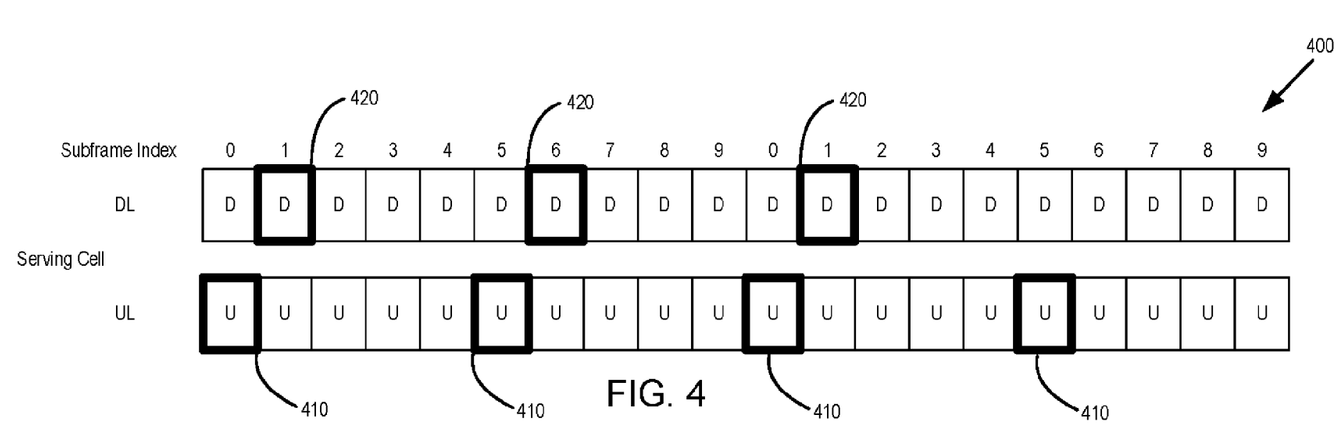
FIGS. 4 and 5 are subframe index transmission timing diagrams for a pair of uplink (UL) and downlink (DL) channels showing, respectively, subframe restriction and aggregation.

2.2. Time-Division Multiplexing (TDM) Based UL Transmission Between PCell and SCell To avoid parallel transmission of uplink channels in PCell 304 and SCell 306, a previous proposal suggested that a UE could transmit an uplink signal in one carrier only in a transmission time interval (TTI). Details are described in proposal no. R2-123997, titled, "Introduction of 1CC transmission in a TTI for UL CA;" by NTT DOCOMO, INC.; Fujitsu; NEC; and Panasonic. In this proposal, the UE uses one radio frequency (RF) carrier requirement and consequently a large MPR is avoided. Nevertheless, such approaches would restrict downlink reception as well if the UE should transmit the corresponding HARQ-ACK in a certain time in the PCell or SCell. For example, FIG. 4 shows a UL subframe restriction timing diagram 400. Bold-outlined 'U' slots 410 represent UL transmission on the serving cell transmitting UCI. Bold-outlined 'ID' slots 420 represent DL transmission on a serving cell. In this approach, the usage of DL and UL timing relationship is fixed.

To schedule downlink transmission regardless of uplink transmission restriction, a change to HARQ-ACK transmission is contemplated when PUCCH transmission is restricted in uplink carrier aggregation. More specifically, the HARQ-ACKs of PDSCH of the multiple downlink subframes are aggregated and transmitted in the allowed uplink subframe, as shown in a subframe aggregation timing diagram 500 of FIG. 5.

Figure 5:
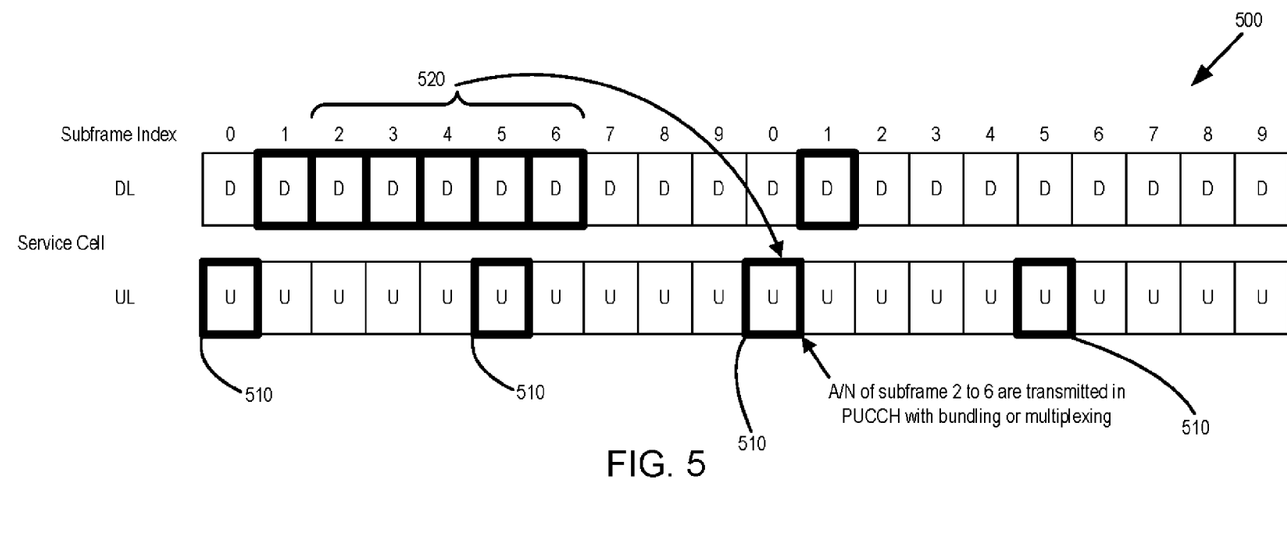

In the examples of FIGS. 4 and 5, it may be assumed that slots 410 and 510 at subframe index 0 and subframe index 5 (and so on) are allowed to transmit uplink signal in PCell. According to the current LTE operation shown in FIG. 4, UE transmits HARQ-ACK in subframe n+4 for FDD if the PDSCH is scheduled in subframe n. This means the UE can transmit 420 HARQ-ACK of PDSCH in the downlink subframe 6 in UL transmission 410 subframe 0. In contrast, FIG. 5 shows the UE transmits 520 HARQ-ACK of PDSCH from downlink subframe 2 to 6 in UL transmission 510 subframe 0. To support the aggregation of diagram 500, additional refinements are described below.

Modification of HARQ timing: HARQ timing relationships are changed to support aggregation. In FDD, the UE transmits HARQ-ACK in n+k subframe if the PDSCH is scheduled in subframe n, where k is larger than or equal to 4 and the uplink subframe is allowed for transmission. In TDD, the UE transmits HARQ-ACK in subframe n for the PDSCH detected in subframe n−k, where k∈K and K (defined in Table 1) is a set of M elements $\{k_0, k_1, \ldots k_{M-1}\}$ depending on the subframe n and the UL-DL configuration.

TABLE 1

Downlink association set index K: $\{k_0, k_1, \ldots k_{M-1}\}$ for TDD

| UL-DL Config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

An offset value (e.g., $k_{offset}$) is defined to accommodate additional subframes between PDSCH reception and HARQ-ACK feedback. For example, the UE transmits HARQ-ACK in subframe n for the PDSCH detected in subframe n−k−$k_{offset}$, where k is as previously defined and $k_{offset}$ is a predetermined integer value or configured by higher layer signaling, such as in the data link layer (layer 2) medium access control (MAC) signaling or in the network layer (layer 3) RRC signaling.

Transmission of multiple HARQ-ACKs: In some embodiments, there are two options for sending HARQ-ACK of multiple subframes. It is noted that for FDD, the two-bit downlink assignment index (DAI) field, which is updated from subframe to subframe, can be added in downlink control information (DCI) for PDSCH. This would enable that field to indicate the accumulative number of PDCCH(s) with assigned PDSCH transmission(s) and provide for a PDCCH indicating a downlink semi-persistent scheduling (SPS) release within the bundling window of each configured serving cell. In other embodiments, DAI may represent the number of scheduled PDSCHs and SPS release within bundling window. A two-bit UL DAI field can be included within DCI for PUSCH. UL DAI represents the total number of subframes with PDSCH transmissions and with PDCCH indicating downlink SPS release to the corresponding UE the bundling window. The bundling window could be configured by RRC signaling. In some embodiments the bundling window could be predetermined.

Option 1: time bundling method can be used over multiple downlink PDSCHs (so called bundling window). If decoding of all received PDSCHs within a bundling window is successful, the UE sends a positive HARQ-ACK. Otherwise, the UE transmits a negative HARQ-ACK. The number of HARQ-ACKs is maintained as 1 bit or 2 bits if multiple-input multiple-output (MIMO) is configured. The bundling operation can be performed per transport block basis. That is, for each transport block (TB), bundling operation can be performed. The PUCCH resource for PUCCH format 1a/1b can be determined by the last detected PDCCH control channel element (CCE) index within a bundling window. In the example of FIG. 5, the bundling window size for UL subframe 0 for HARQ-ACK transmission is five. Alternatively, HARQ-ACK multiplexing can be used for HARQ-ACK transmission. The information of HARQ-ACK can be conveyed by combination of selected PUCCH resource and modulated symbol. The details of HARQ-ACK bundling and HARQ- ACK multiplexing can be found in section 10.1.3.1 of 3GPP technical specification no. 36.213, version 10.7.0.

Option 2: This option is for when multiplexing is used. If PUCCH format 3 is configured, up to 20 bits of HARQ-ACK bits can be multiplexed. Therefore, in FDD, HARQ-ACKs of up to 10 subframe can be multiplexed assuming one serving cell is served by the macrocell or the smallcell. If PUCCH format 3 can convey up to 22 bits of HARQ-ACK bits, HARQ-ACKs of up to 10 subframe can be multiplexed assuming one serving cell is served by the macrocell or the smallcell.

Hereafter, two methods are presented for configuring DL subframe and UL subframe for a certain serving cell (macrocell or smallcell). In a first embodiment, UL subframes for a serving cell are configured by RRC signaling. Then, for a UL subframe n, the DL subframes between n−k1 and n−k2 can be defined as the bundling window. For the example of FIG. 5, k1=8 and k2=4. In a second embodiment, the bundling window size is configured by RRC signaling. Then, for the last DL subframe n within the bundling window, n+k3 is determined as UL subframe. For the example of FIG. 5, k3=4.

2.3. Overhearing of PUCCH Transmitted to PCell

Figure 6:
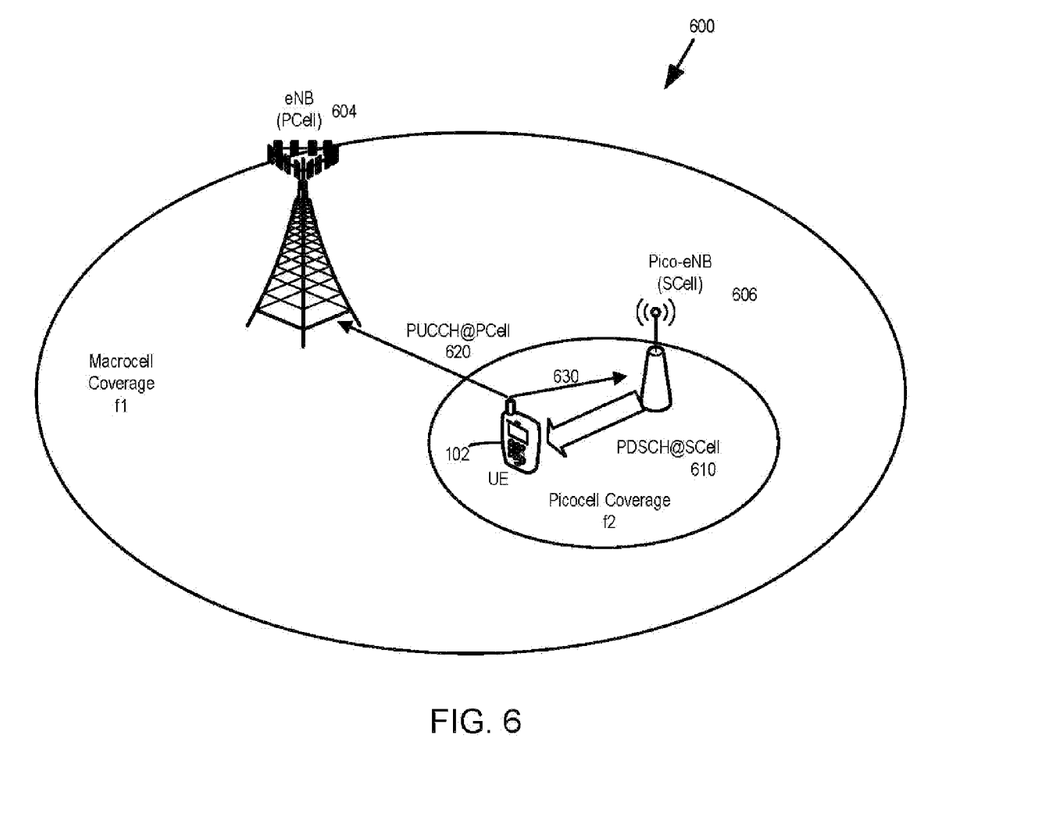
FIG. 6 is a block diagram showing a smallcell overhearing a primary uplink control channel (PUCCH) transmission to a macrocell.

FIG. 6 shows a network 600 in which there is no change in UE operation for when UE 102 transmits 620 HARQ-ACK/CSI in PUCCH on PCell. Network 600 avoids forwarding HARQ-ACK/CSI information via X2 interface 110 from macrocell 604 to smallcell 606 because smallcell 606 receives transmitted 620 PUCCH on PCell, i.e., smallcell 606 overhears PUCCH transmitted 620 to the macrocell 604. Smallcell 606 has the capability to receive uplink signal in the carrier frequency of macrocell 604. Accordingly, in some embodiments, smallcell 606 has multiple RF chains. One RF chain is used to serve the carrier frequency for SCell 606 and the other RF chain is used to overhear the carrier frequency for PCell 604. In other embodiments, the smallcell 606 switches between operation as a PCell and an SCell when smallcell 606 needs to receive PUCCH from UE 102 that has configured smallcell 606 as an SCell. This overhearing technique may be used when macrocell 604 is operated as PCell and transmits PUCCH while smallcell 606 is deployed within the macrocell coverage. In this case, smallcell 606 can readily receive the PUCCH from macrocell 604 due to a large transmit power of PUCCH accommodating the pathloss between macrocell and the UE.

To support overhearing, macrocell 604 provides the following information to smallcell 606 with the PUCCH configuration.

CSI: a dedicated PUCCH resource is configured for UE 102 to transmit periodic CSI. The dedicated periodic CSI information is signaled to the smallcell when smallcell 606 is added as an SCell via X2 interface.

HARQ-ACK: in LTE Rel-10, PUCCH format 1b with channel selection or PUCCH format 3 may be used depending on the number of HARQ-ACKs or RRC configuration. In both cases, the set of candidate PUCCH format resources are configured with RRC signaling and the actual PUCCH resource for HARQ-ACK is indicated by TPC command in PDCCH for SCell. As described in section 2.1, a predetermination is made for the allocated PUCCH resource before PDSCH is scheduled in the SCell. In some embodiments, the SCell also knows which PUCCH resource is used when PDSCH in SCell is scheduled.

Because smallcell 606 receives and decodes PUCCH (CSI and HARQ-ACK) transmitted to macrocell 604, the transmission power of PUCCH targeted for smallcell should be controlled based on the channel condition between UE 102 and smallcell 604 instead of the channel condition between UE 102 and macrocell 604. This means that the power control of PUCCHs targeted for macrocell and smallcells would be independent of each other. When UE 102 is transmitting PUCCH targeted for macrocell 606, UE 102 follows existing procedures to set PUCCH transmission power. When UE 102 is transmitting PUCCH targeted for smallcell 606, UE 102 sets the PUCCH transmission power according to the pathloss between UE 102 and smallcell 606, and it sets TPC commands received, and other configured parameters.

TPC commands for PUCCH targeted for smallcell 606 can be sent either from macrocell 604 or smallcell 606. If TPC command is sent from macrocell 604, smallcell 606 can send the TPC command to macrocell 604 via X2 signaling; in addition, in PDCCHs carrying TPC command, one field is provided to distinguish whether the TPC command is to control the transmission power for PUCCH targeted for macrocell 604 or smallcell 606.

2.4. Buffer Status Reporting (BSR) Transmission

UE 102 may independently transmit short BSR to macrocell 604 and smallcell 606. To address this independent transmission, two scenarios are described as follows:

Scenario A: When UE 102 sends separate BSRs to macrocells and smallcells, a smallcell can transmit BSR information to a macrocell eNB via X2 signaling, so that macrocell eNB can account for this information, e.g., flow control or scheduling in the macrocell eNB.

Scenario B: UE 102 sends BSR to a macrocell but not a smallcell because the BSR contains the information of logical channels to be transmitted to the smallcell, the macrocell can transmit BSR information to the smallcell via X2 signaling, so that smallcell can schedule UL transmission accordingly.

2.5. Scheduling Request (SR) Transmission

A scheduling request is used for requesting uplink shared channel (UL-SCH) resources for a new transmission. In this section, a UE (e.g., UE 102) may transmit in both macrocell and smallcells (e.g., macrocell 604 and smallcell 606). Because BSR may be triggered independently for macrocell and smallcell, this section describes that SR can also be triggered independently for macrocell and smallcells, according to three cases.

Case 1 is when a UE is allocated a valid PUCCH resource to transmit an SR in a smallcell. In this case, when an SR is pending for a smallcell, UE can transmit the SR in the allocated PUCCH resource in the smallcell.

Case 2 is when a UE does not have a valid PUCCH resource to transmit an SR in a smallcell, but the UE has an UL resource available in a macrocell. There are several options to address this case.

Option A: When an SR is pending, a UE initiates a random access procedure on a smallcell and sends cell radio network temporary identifier (C-RNTI) MAC control element in Msg3. Msg3 is the first scheduled UL transmission on UL-SCH after a random access response (Msg2). The smallcell may allocate a UL resource for the UE to send BSR either in a random access response (Msg2) or after receiving the Msg3.

Option B: When an SR is pending, a UE transmits BSR MAC control element in a macrocell. The UE can either use short BSR or long BSR. Because the BSR contains logical channel IDs, the macrocell can forward the relevant BSR to the smallcell via X2 signaling, so that the smallcell can, accordingly, allocate an UL resource to the UE.

Option C: When an SR is pending, a UE transmits BSR in a RRC signaling to a macrocell. The Macrocell can forward the relevant BSR to a smallcell via X2 signaling, so that the smallcell can, accordingly, allocate an UL resource to the UE.

Case 3 is when a UE does not have a valid PUCCH resource to transmit an SR either in a smallcell or in a macrocell. In this case, the aforementioned option A technique may be used.

In LTE Rel-11 networks, when an SR is pending, a UE can initiate a random access procedure on the PCell. In a Msg3, the UE can send a C-RNTI MAC control element. For an inter-eNB CA deployment scenario, there are two options for UE operation:

Option D: When an SR is pending, a UE initiates a random access procedure on a macrocell, and sends a C-RNTI MAC control element in an Mgs3. When the macrocell grants an UL resource, the UE can transmit BSR including information for the UL logical channels which are transmitted to the smallcells. When a macrocell receives the BSR, it can forward the BSR to the smallcell via X2 signaling, so that the smallcell can, accordingly, allocate an UL resource to the UE.

Option E: When an SR is pending, a UE initiates a random access procedure on a macrocell, and sends a new MAC control element in a Mgs3. The new MAC control element can contain both a C-RNTI and a flag indicating whether the SR is for a macrocell or a smallcell. If the flag indicates that the SR is for a macrocell, the macrocell can allocate an UL resource accordingly; otherwise, the macrocell can inform the smallcell that the UE has an SR pending via X2 signaling.

According to some embodiments, the UE can initiate a random access procedure either on the macrocell or on the smallcell depending on whether the data is transmitted on the smallcell or macrocell.

2.6. timeAlignmentTimer Expiry Handling

This section describes techniques applicable irrespective of whether a UE transmits only to a macrocell or to both macrocell and smallcells.

In LTE Rel-11 networks, when the timeAlignmentTimer associated with the primary timing advance group (TAG) expires, a UE performs the following steps: (1) flush all HARQ buffers for all serving cells; (2) notify RRC to release PUCCH/SRS for all serving cells; (3) clear any configured downlink assignments and uplink grants; and (4) consider all running timeAlignmentTimers as expired.

For inter-eNB CA, with the above example, because smallcell and macrocells operate rather independently, a UE can apply the above-listed operations for serving cells within the primary TAG (i.e., cells other than the smallcells within the secondary TAG) if the timeAlignmentTimer associated with the primary TAG expires. In other words, for a smallcell, a UE may keep HARQ buffers, PUCCH/SRS, configured downlink assignments and uplink grants, and the UE may consider timingAlignmentTimer of secondary TAGs as still running so long as timeAlignmentTimer for the smallcells are running. In some embodiments, therefore, only a subset of the four actions is applicable to a smallcell. For example, a UE may apply actions (1) and (2) to a smallcell, i.e., flush HARQ buffers for the smallcell and notify RRC to release PUCCH/SRS for the smallcell.

3. Example User Equipment (UE)

Figure 7:
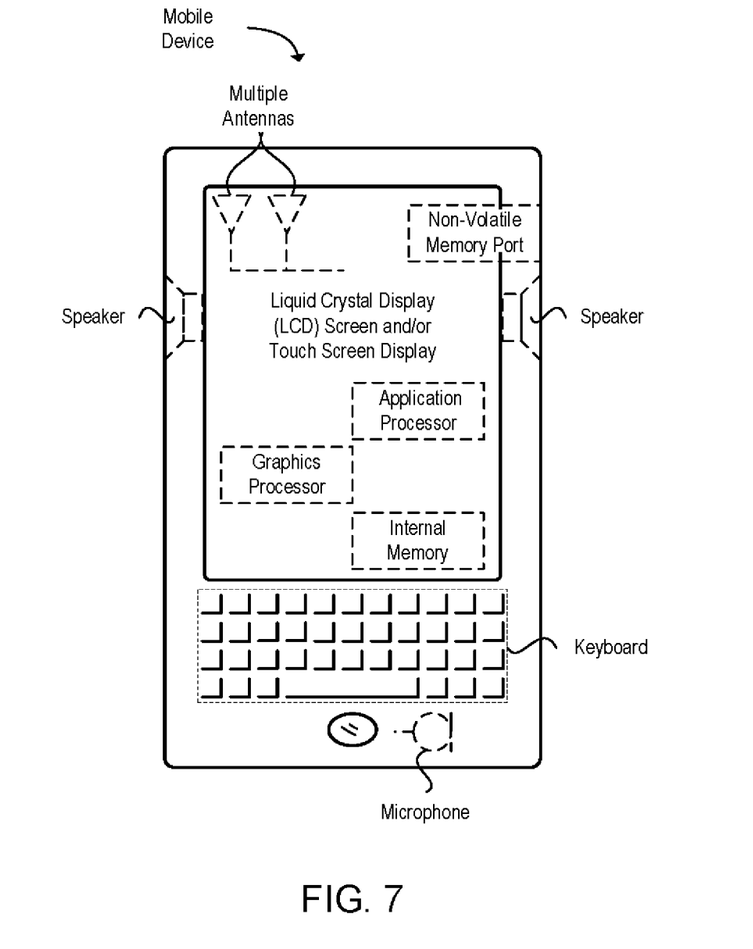
FIG. 7 is a block diagram of a wireless communication device UE in accordance with some embodiments.

FIG. 7 provides an example illustration of a mobile device, such as a user equipment (UE), a mobile station (MS), a mobile wireless device, a mobile communication device, a tablet, a handset, or other type of mobile wireless device. The mobile device can include one or more antennas configured to communicate with transmission station, such as a base station (BS), an EUTRAN Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 7 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

4. Example Embodiments

In an example embodiment, a UE for communication in a wireless network supporting inter-eNB CA comprises: a receiver to communicate with a first eNB corresponding to a PCell in the wireless network and a second eNB corresponding to an SCell in the wireless network, the receiver configured to receive downlink data through a PDSCH in the SCell; a processor configured to, in response to receiving the downlink data, generate a HARQ-ACK for the SCell, and further configured to select between the PCell and the SCell as a first PUCCH resource; and a transmitter configured to transmit, through the first PUCCH resource, UCI including the HARQ-ACK for the SCell.

According to certain such embodiments, the UE the receiver is further configured to receive TPC data through a PDCCH in the SCell during SCell scheduling, the TPC data including an indication of the first PUCCH resource. In some embodiments, the UE receiver is configured to receive a signal from the first eNB in the PCell during SCell scheduling to indicate the first PUCCH resource for the transmitter to transmit the UCI in the PCell. According to still further embodiments, the UE processor is configured to select the first PUCCH resource corresponding to a first PUCCH format in the PCell, and to select a second PUCCH resource corresponding to a second PUCCH format in the SCell. In yet further embodiments, the UE transmitter is configured to transmit, through the second PUCCH resource in the SCell, a scheduling request on a scheduling request resource or on an ACK/NACK resource. According to some embodiments, the UE transmitter is further configured to transmit, through a second PUCCH resource in the SCell, the UCI including the HARQ-ACK, wherein the HARQ-ACK comprises aggregated ACK/NACK for carrier aggregation. In additional embodiments, the UE processor is further configured to configure the transmitter for uplink switching such that the transmitter transmits the UCI through the PUCCH resource in the PCell in a subframe n and through the PUCCH resource in the SCell in a subframe n+1.

In another example embodiment, a UE for communication in a wireless network supporting inter-eNB CA comprises: a receiver to communicate with a first eNB corresponding to PCell in the wireless network and a second eNB corresponding to an SCell in the wireless network, the receiver configured to receive downlink data through a PDSCH; a processor configured to: allow, in a first set of subframes associated with the PCell, transmissions of UCI through a first PUCCH in the PCell; restrict, in a second set of subframes associated with the PCell, the transmission of the UCI through the first PUCCH; in response to receiving the downlink data, generate a HARQ-ACK; and aggregate a plurality of HARQ-ACKs (aggregated HARQ-ACK) of the PDSCH corresponding to respective downlink subframes associated with the PCell. The UE has a transmitter configured to transmit in one of the subframes of the first set of subframes, the aggregated HARQ-ACK.

In certain such embodiments, the UE aggregated HARQ-ACK comprises: a positive HARQ-ACK if the UE successfully decodes a plurality of received PDSCHs received during a bundling window; and a negative HARQ-ACK if the UE does not successfully decode the plurality of received PDSCHs received during the bundling window. According to some embodiments, the UE aggregated HARQ-ACK comprises a plurality of bits representing a multiplexing of the plurality of HARQ-ACKs corresponding to the respective downlink subframes associated with the PCell.

In another example embodiment, a UE for communication in a wireless network supporting inter-eNB CA comprises: a receiver to communicate with a first eNB corresponding to a PCell in the wireless network and a second eNB corresponding to an SCell in the wireless network; and a processor configured to: determine an expiration of a first time alignment timer associated with a TAG of the PCell; and respond to the determination of the expiration of the first time alignment timer by performing at least one of: (A) flushing HARQ buffers corresponding to the PCell and keeping HARQ buffers corresponding to the SCell; (B) notifying RRC to release a first PUCCH in the PCell; (C) clearing configured downlink assignments and uplink grants corresponding to the PCell and maintaining the downlink assignments and uplink grants corresponding to the SCell; and (D) considering a running second time alignment timer of the PCell as expired and considering a running third time alignment timer of the SCell as still running. In some embodiments, the UE processor is further configured to respond to the determination of the expiration of the first time alignment timer by performing each of (A)-(D).

In another example embodiment, a computer-readable media having instructions that, when executed by a processor, cause an eNB of a picocell in a wireless communication network to: receive, from a macrocell in the wireless communication network, configuration information for communication with a UE; process the configuration information to identify resources used by the UE to transmit an uplink signal to the macrocell, the identified resources including a first carrier frequency corresponding to the uplink signal; intercept the uplink signal transmitted at the first carrier frequency by the UE to the macrocell; and process the intercepted uplink signal to determine UCI corresponding to the picocell.

In certain such embodiments, the computer-readable media instructions, when executed by the processor, further cause the eNB to: configure a first RF chain of the eNB to communicate with the UE in the picocell using a second carrier frequency for secondary cell service; and configure a second RF chain of the eNB to intercept the uplink signal transmitted at the first carrier frequency. According to some embodiments, the computer-readable media instructions, when executed by the processor, further cause the eNB to: configure a RF chain of the eNB to communicate with the UE in the picocell using a second carrier frequency for secondary cell service; and reconfigure the RF chain to intercept the uplink signal transmitted at the first carrier frequency. In additional embodiments, the computer-readable media instructions cause the eNB UCI to comprise CSI, and wherein the configuration information includes an indication of a dedicated PUCCH resource configured for the UE to transmit periodic CSI to the macrocell. In other embodiments, the UCI comprises a HARQ-ACK, wherein the configuration information includes an indication of a PUCCH format for communication of the HARQ-ACK, and wherein the instructions, when executed by the processor, further cause the eNB to: determine the PUCCH format before scheduling a PDSCH for secondary cell service to the UE. According to some further embodiments, the computer-readable media instructions, when executed by the processor, further cause the eNB to: communicate TPC data to the macrocell for relay to the UE, the TPC data indicating a transmission power of a PUCCH between the UE and the eNB of the picocell. In still further embodiments, the computer-readable media instructions, when executed by the processor, further cause the eNB to: receive, from the macrocell, buffer status reporting information including data received from the UE for establishing logical channels.

In another example embodiment, an eNB corresponding to a first cell in a 3GPP network comprises processing circuitry to: establish communication with a second cell and a UE in the 3GPP network; receive BSR transmissions from the UE, the BSR transmissions including data for the first cell to forward to the second cell through an X2 communication channel; and forward BSR data to the second cell using the X2 communication channel. In some embodiments the first cell is a smallcell and the second cell is a macrocell. In other embodiments the first cell is a macrocell, the second cell is a smallcell, and the BSR data includes information used by the smallcell for establishing uplink logical channels. In still other embodiments, the BSR transmissions include BSR MAC control element data for the first cell to forward to the second cell through an X2 communication channel. In still further embodiments the eNB processing circuitry is further configured to receive the BSR transmissions in a RRC signaling.

In another example embodiment, a UE in a 3GPP network comprises circuitry to: establish communication with a first cell and a second cell in the 3GPP network; and selectively trigger independent SR transmissions to at least one of the first cell and the second cell, the SR transmission for requesting UL-SCH resources for a new transmission.

In certain such embodiments, the UE processing circuitry is further configured to: determine that the UE is allocated a valid PUCCH resource to transmit the SR transmissions in the second cell; and when the SR transmission is pending in the second cell, transmit the SR transmission in the PUCCH resource in the second cell. In other embodiments, the UE processing circuitry is further configured to: determine that the UE does not have a valid PUCCH resource allocated to transmit the SR transmissions in the second cell; determine that an uplink resource is not available in the second cell; and when the SR transmission is pending for the second cell, initiate a random access procedure for the second cell to allocate uplink resources to the UE. In still further embodiments, the UE processing circuitry is further configured to: determine that the UE does not have a valid PUCCH resource allocated to transmit the SR transmissions in the second cell; determine that an uplink resource is available in the first cell; and transmit a BSR MAC control element to the first cell, the BSR MAC control element including data for the first cell to forward to the second cell such that the second cell can allocate uplink resources to the UE. In still other embodiments, the UE processing circuitry is further configured to: determine that the UE does not have a valid PUCCH resource allocated to transmit the SR in the first cell or the second cell; initiate a random access procedure for the first cell to allocate uplink resources in the first cell to the UE; and transmit, (using the allocated uplink resources) the BSR transmission to the first cell, the BSR transmission including data for the first cell to forward to the second cell such that the second cell can allocate uplink resources to the UE. According to other embodiments, the UE processing circuitry is further configured to: determine that the UE does not have a valid PUCCH resource allocated to transmit the SR transmissions in the first cell or the second cell; and initiate a random access procedure to send a MAC control element to the first cell, the MAC control element including both a C-RNTI and a flag indicating whether the SR transmission is for the first cell or the second cell.

The techniques introduced above can be implemented by programmable circuitry programmed or configured by software and/or firmware, or they can be implemented entirely by special-purpose hardwired circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware embodiments for implementing the techniques introduced herein may be stored on a machine-readable storage medium and may be executed by one or more general-purpose or special-purpose programmable microprocessors. A machine-readable or computer-readable medium, as the term is used herein, includes any mechanism that can store information in a form that is accessible by a machine (a machine may be, for example, a computer, network device, cellular phone, PDA, manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; or other media).

Although the present disclosure includes reference to specific example embodiments, it will be recognized that the claims are not limited to the embodiments described, but can be practiced with modification and alteration within the spirit and scope of the appended claims. Accordingly, the specification and drawings are to be regarded in an illustrative sense rather than a restrictive sense.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). In some embodiments, one or more processors may be configured with instructions stored on a computer-readable storage device medium.

It will be understood by skilled persons that many changes may be made to the details of the above-described embodiments without departing from the underlying principles of the invention. The scope of the present invention should, therefore, be determined only by the following claims.

The invention claimed is:

1. A user equipment (UE) for communication in a wireless network supporting inter-EUTRAN Node B carrier aggregation, the UE comprising:
a receiver to receive first downlink data from a first EUTRAN Node B (eNB) corresponding to a primary cell (PCell) in the wireless network, and to receive second downlink data from a second eNB corresponding to a secondary cell (SCell) in the wireless network;
a processor configured to, in response to receiving the first downlink data, generate a first hybrid automatic repeat request acknowledgement (HARQ-ACK) for the PCell, in response to receiving the second downlink data, generate a second HARQ-ACK for the SCell and further configured to select between use of a first physical uplink control channel (PUCCH) resource in the PCell and a second PUCCH resource in the SCell; and
a transmitter configured to transmit, through the first PUCCH resource, first uplink control information (UCI) including the first HARQ-ACK for the PCell, and to transmit, through the second PUCCH resource, second UCI including the second HARQ-ACK for the SCell.

2. The UE of claim 1, wherein the processor is further configured to select the first PUCCH resource corresponding to a first PUCCH format in the PCell, and to select the second PUCCH resource corresponding to a second PUCCH format in the SCell.

3. The UE of claim 1, wherein the transmitter is further configured to transmit, through the first PUCCH resource in the PCell, a scheduling request on a scheduling request resource or on an acknowledgement/negative acknowledgement (ACK/NACK) resource for the PCell and to transmit, through the second PUCCH resource in the SCell, a scheduling request on a scheduling request resource or on an acknowledgement/negative acknowledgement (ACK/NACK) resource for the SCell.

4. The UE of claim 1, wherein the first HARQ-ACK and the second HARQ-ACK comprise an aggregated acknowledgement/negative acknowledgement (ACK/NACK) for carrier aggregation.

5. The UE of claim 1, wherein the processor is further configured for uplink switching such that the transmitter is configured to transmit on the first PUCCH resource in the PCell in a subframe n and on the second PUCCH resource in the SCell in a subframe n+1.

6. The UE of claim 1, wherein the processor is configured to maintain a first time alignment timer allocated to a primary timing advance group (TAG) associated with the PCell and a second time alignment timer allocated to a secondary TAG associated with the SCell.

7. The UE of claim 6, wherein the processor is configured to, in response to the first time alignment timer expiring, maintain HARQ-ACK buffers while the second time alignment timer has not expired.

8. The UE of claim 6, wherein the processor is configured to, in response to the first time alignment timer expiring, maintain PUCCH configurations for serving cells while the second time alignment timer has not expired.

9. The UE of claim 6, wherein the processor is configured to, in response to the first time alignment timer expiring, maintain downlink configurations and uplink grants while the second time alignment timer is not expired.

10. The UE of claim 6, wherein the processor is configured to, in response to the first time alignment timer expiring, continue running the second time alignment timer.

11. A user equipment (UE) for communication in a wireless network supporting inter-EUTRAN Node B carrier aggregation, the UE comprising:
- a receiver to communicate with a first EUTRAN Node B (eNB) corresponding to a primary cell (PCell) in the wireless network and a second eNB corresponding to a secondary cell (SCell) in the wireless network, wherein the first eNB includes a physical uplink control channel (PUCCH) resource, the receiver configured to receive downlink data through a physical downlink shared channel (PDSCH) in the SCell;
- a processor configured to, in response to receiving the downlink data, generate a hybrid automatic repeat request acknowledgement (HARQ-ACK) for the second eNB; and
- a transmitter configured to transmit, through the PUCCH resource of the first eNB, uplink control information (UCI) including the HARQ-ACK for the second eNB.

12. The UE of claim 11, wherein the receiver is further configured to receive a signal from the first eNB in the PCell during SCell scheduling to indicate the PUCCH resource for the transmitter to transmit the UCI in the PCell.

13. The UE of claim 11, wherein the receiver is further configured to receive transmit power control (TPC) data through a physical downlink control channel (PDCCH) in the SCell during SCell scheduling, the TPC data including an indication of the PUCCH resource.

14. The UE of claim 11, wherein the transmitter is further configured to transmit, through the PUCCH resource in the PCell, a scheduling request for the SCell.

15. The UE of claim 11, wherein the transmitter is further configured to transmit, through a physical uplink shared channel (PUSCH) resource in the PCell, a buffer status report (BSR) for the SCell.

16. A user equipment (UE) for communication in a wireless network supporting inter-EUTRAN Node B carrier aggregation, the UE comprising:
- a receiver to communicate with a first EUTRAN Node B (eNB) corresponding to a primary cell (PCell) in the wireless network and a second eNB corresponding to a secondary cell (SCell) in the wireless network, wherein the second eNB includes a physical uplink control channel (PUCCH) resource, the receiver configured to receive downlink data through a physical downlink shared channel (PDSCH) in the PCell;
- a processor configured to, in response to receiving the downlink data, generate a hybrid automatic repeat request acknowledgement (HARQ-ACK) for the first eNB; and
- a transmitter configured to transmit, through the PUCCH resource of the second eNB, uplink control information (UCI) including the HARQ-ACK for the first eNB.

17. The UE of claim 16, wherein the transmitter is further configured to transmit, through the PUCCH resource in the SCell, a scheduling request for the PCell.

18. The UE of claim 16, wherein the transmitter is further configured to transmit, through a physical uplink shared channel (PUSCH) resource in the SCell, a buffer status report (BSR) for the PCell.

19. The UE of claim 16, wherein the receiver is further configured to receive a signal from the second eNB in the SCell during PCell scheduling to indicate the PUCCH resource for the transmitter to transmit the UCI in the SCell.

20. The UE of claim 16, wherein the receiver is further configured to receive transmit power control (TPC) data through a physical downlink control channel (PDCCH) in the PCell during PCell scheduling, the TPC data including an indication of the PUCCH resource.

* * * * *